United States Patent
Qiu et al.

(10) Patent No.: US 10,034,226 B2
(45) Date of Patent: Jul. 24, 2018

(54) METHOD, APPARATUS AND SYSTEM FOR ACQUIRING SYSTEM INFORMATION

(71) Applicant: FUJITSU LIMITED, Kawasaki-shi, Kanagawa (JP)

(72) Inventors: Tao Qiu, Beijing (CN); Haibo Xu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 10 days.

(21) Appl. No.: 15/096,826

(22) Filed: Apr. 12, 2016

(65) Prior Publication Data

US 2016/0227472 A1   Aug. 4, 2016

Related U.S. Application Data

(63) Continuation of application No. PCT/CN2013/086743, filed on Nov. 8, 2013.

(51) Int. Cl.
*H04W 48/10* (2009.01)
*H04W 52/02* (2009.01)
(Continued)

(52) U.S. Cl.
CPC ............. *H04W 48/10* (2013.01); *H04W 4/50* (2018.02); *H04W 4/70* (2018.02); *H04W 48/12* (2013.01);
(Continued)

(58) Field of Classification Search
CPC ... H04W 48/10; H04W 68/005; H04W 48/12; H04W 52/0229; H04W 52/0216;
(Continued)

(56) References Cited

U.S. PATENT DOCUMENTS 8,868,743 B2 * 10/2014 Park ...................... H04W 4/00
                                                  709/223
9,125,157 B2 * 9/2015 Jeong ................ H04W 52/0216
(Continued)

FOREIGN PATENT DOCUMENTS

CN          101873669 A     10/2010
CN          102215567 A     10/2011
(Continued)

OTHER PUBLICATIONS

Notice of Preliminary Rejection issued by the Korean Intellectual Property Office for corresponding Korean Patent Application No. 10-2016-7010969 dated Dec. 12, 2016, with an English translation.
(Continued)

*Primary Examiner* — Brian O'Connor
(74) *Attorney, Agent, or Firm* — Myers Wolin, LLC.

(57) ABSTRACT

The embodiments of the present disclosure provide a method, an apparatus and a system for acquiring system information. The method for acquiring includes setting at least two indicators for indicating a system information update, the at least two indicators being corresponding to at least two User Equipments (UEs); and sending the indicators to the UEs, so that the UEs acquire system information according to their respective modification periods. Through the embodiments of the present disclosure, for example the MTC UE can acquire the latest system information in time, while ensuring that any extra and unnecessary acquisition of system information is not performed to reduce the power consumption of the MTC UE.

17 Claims, 7 Drawing Sheets

(51) Int. Cl.
  *H04W 48/12* (2009.01)
  *H04W 68/00* (2009.01)
  *H04W 4/50* (2018.01)
  *H04W 4/70* (2018.01)
  *H04W 72/04* (2009.01)
  *H04W 36/22* (2009.01)
  *H04L 5/00* (2006.01)
  *H04W 4/90* (2018.01)

(52) U.S. Cl.
  CPC ... *H04W 52/0216* (2013.01); *H04W 52/0229* (2013.01); *H04W 68/005* (2013.01); *H04L 5/0032* (2013.01); *H04L 5/0055* (2013.01); *H04L 5/0092* (2013.01); *H04W 4/90* (2018.02); *H04W 36/22* (2013.01); *H04W 72/042* (2013.01); *Y02D 70/00* (2018.01); *Y02D 70/1262* (2018.01); *Y02D 70/21* (2018.01)

(58) Field of Classification Search
  CPC ... H04W 4/001; H04W 4/005; H04W 72/042; H04W 4/22; H04W 36/22; H04L 5/0092; H04L 5/0032; H04L 5/0055; Y02B 60/50
  See application file for complete search history.

(56) References Cited

U.S. PATENT DOCUMENTS

| | | | |
|---|---|---|---|
| 9,264,979 B2* | 2/2016 | Fong | H04W 48/12 |
| 9,294,714 B2* | 3/2016 | Gupta | H04W 4/70 |
| 9,326,207 B2* | 4/2016 | Jha | H04W 36/22 |
| 9,485,765 B2* | 11/2016 | Kim | H04W 52/0216 |
| 9,553,701 B2* | 1/2017 | Sadeghi | H04L 5/005 |
| 9,655,029 B2* | 5/2017 | Fong | H04W 48/12 |
| 9,699,765 B2* | 7/2017 | Sagfors | H04W 72/02 |
| 9,743,352 B2* | 8/2017 | Hoglund | H04W 52/0216 |
| 9,839,030 B2* | 12/2017 | Zheng | H04W 72/0446 |
| 2005/0249141 A1 | 11/2005 | Lee et al. | |
| 2009/0124245 A1 | 5/2009 | Somasundaram et al. | |
| 2009/0207774 A1 | 8/2009 | Lee et al. | |
| 2009/0310503 A1 | 12/2009 | Tenny et al. | |
| 2010/0067496 A1 | 3/2010 | Choi | |
| 2011/0171929 A1* | 7/2011 | Tamura | H04W 48/12 455/404.1 |
| 2012/0327848 A1 | 12/2012 | Somasundaram et al. | |
| 2013/0028184 A1 | 1/2013 | Lee et al. | |
| 2014/0321381 A1* | 10/2014 | Guo | H04W 52/0251 370/329 |
| 2014/0348020 A1 | 11/2014 | Tenny et al. | |
| 2016/0192434 A1* | 6/2016 | Du | H04W 52/0216 370/329 |

FOREIGN PATENT DOCUMENTS

| | | |
|---|---|---|
| JP | 2013-516887 A | 5/2013 |
| JP | 2013-183299 A | 9/2013 |
| KR | 10-2010-0101669 A | 9/2010 |
| WO | 2010/032477 A1 | 3/2010 |
| WO | 2013/049768 A1 | 4/2013 |
| WO | 2013/091505 A1 | 6/2013 |

OTHER PUBLICATIONS

International Search Report issued for corresponding International Patent Application No. PCT/CN2013/086743, dated Aug. 21, 2014, with an English translation attached.
Written Opinion issued for corresponding International Patent Application No. PCT/CN2013/086743, dated Aug. 20, 2014, with an English translation attached.
Extended European search report with supplementary European search report and the European search opinion issued by the European Patent Office for corresponding European Patent Application No. 13897013.2, dated Mar. 16, 2017.
Notification of Reasons for Refusal issued for corresponding Japanese Patent Application No. 2016-550906, dated Aug. 29, 2017, with an English translation.
Notification of Reasons for Refusal issued by the Japan Patent Office for corresponding Japanese Patent Application No. 2016-550906, dated Dec. 5, 2017, with an English translation.
Communication pursuant to Article 94(3) EPC issued by the European Patent Office for corresponding European Patent Application No. 13 897 013.2-1213, dated Feb. 8, 2018.

* cited by examiner

Fig. 16

METHOD, APPARATUS AND SYSTEM FOR ACQUIRING SYSTEM INFORMATION

CROSS REFERENCE TO RELATED APPLICATIONS

This application is a continuation application of International Application PCT/CN2013/086743 filed on Nov. 8, 2013, the entire contents of which are incorporated herein by reference.

TECHNICAL FIELD

The present disclosure relates to the field of communications, and particularly, to a method, an apparatus and a system for acquiring system information.

BACKGROUND

With continuous development of wireless communications, Machine Type Communication (MTC) applications are more and more popular, which mainly include goods tracing/tracking, environment/climate monitoring, telemedicine, etc. Since application scenarios of MTC are very wide, research topics on MTC also increase currently, such as researches on energy saving, cost reduction, and improvement of network coverage. However, regarding all those researches, one important premise is that the research objects of those topics can only be achieved by performing an enhancement on the basis of current LTE system.

With continuous researches, those topics may encounter the same problem, i.e., how to acquire System Information (SI) of network broadcasting. The system information is essential information for ensuring normal works of a User Equipment (UE) (either in an idle state or a connected state). The system information is broadcasted by a base station in a certain cell, and all UEs in the cell shall acquire necessary system information. Only after acquiring the necessary system information, the UEs can perform processes such as cell selection/reselection, cell handover and service initiation.

It shall be noted that the above description of the background is merely provided for clear and complete explanation of the present disclosure and for easy understanding by those skilled in the art. And it shall not be understood that the above technical solution is known to those skilled in the art as it is described in the background of the present disclosure.

SUMMARY

However, the inventor finds that many problems may be caused by employing the system information acquiring mechanism of the current LTE system, due to some specificities of the MTC UE, such as the system information is not updated in time, the downlink reception capacity is limited and the channel condition is bad.

For example, a UE cannot acquire the system information in time; when a modification period (for example, it may be referred as a legacy modification period) of the system information update is shorter than a paging cycle of the MTC UE (that is to say, the MTC UE is configured with a paging cycle longer than the modification period of the system information), the UE cannot timely receive an update indication contained in a paging message in one modification period. Or an unnecessary acquisition of the system information occurs; since most MTC UEs are of low speed and not sensitive to delay, the MTC UE has a slightly lower update frequency for the system information than a legacy UE (that is to say, the legacy UE is configured with a paging cycle shorter than or equal to the modification period of the system information).

The embodiments of the present disclosure provide a method, an apparatus and a system for acquiring system information to enhance the current system information update mechanism, so that the MTC UE can acquire the latest system information in time, while ensuring that any extra and unnecessary acquisition of system information is not performed to reduce power consumption of the MTC UE.

According to one aspect of the embodiments of the present disclosure, a method for acquiring system information is provided, including:

setting at least two indicators for indicating a system information update, the at least two indicators being corresponding to at least two UEs; and sending the indicators to the UEs, so that the UEs acquire system information according to their respective modification periods.

According to another aspect of the embodiments of the present disclosure, a method for acquiring system information is provided, including:

receiving, by a UE, an indicator for indicating a system information update;

determining that the indicator is corresponding to the UE; and acquiring system information according to a modification period of the UE.

According to another aspect of the embodiments of the present disclosure, a method for configuring modification period is provided, including:

configuring modification periods for a system information update for at least two UEs, respectively, so that the at least two UEs acquire system information according to their respective modification periods.

According to another aspect of the embodiments of the present disclosure, a method for configuring modification period is provided, including:

receiving configuration information of a modification period sent by a base station, wherein the base station configures modification periods for at least two UEs, respectively; and acquiring the modification period for a system information update according to the configuration information.

According to another aspect of the embodiments of the present disclosure, a method for acquiring system information is provided, including:

sending a part or all of the system information to a UE through a dedicated signaling.

According to another aspect of the embodiments of the present disclosure, an apparatus for acquiring system information is provided, including:

an indicator setting unit, configured to set at least two indicators for indicating a system information update, the at least two indicators being corresponding to at least two UEs; and an indicator sending unit, configured to send the indicators to the UEs, so that the UEs acquire system information according to their respective modification periods.

According to another aspect of the embodiments of the present disclosure, an apparatus for acquiring system information is provided, including:

an indicator receiving unit, configured to receive an indicator for indicating a system information update sent by a base station;

an indicator determining unit, configured to determine that the indicator is corresponding to a UE; and an information acquiring unit, configured to acquire system information according to a modification period of the UE.

According to another aspect of the embodiments of the present disclosure, an apparatus for configuring modification period is provided, including:

a period configuring unit, configured to configure modification periods for a system information update for at least two UEs, respectively, so that the at least two UEs acquire system information according to their respective modification periods.

According to another aspect of the embodiments of the present disclosure, an apparatus for configuring modification period is provided, including:

a configuration receiving unit, configured to receive configuration information of a modification period sent by a base station, wherein the base station configures modification periods for at least two UEs, respectively; and a period acquiring unit, configured to acquire the modification period for the system information update according to the configuration information.

According to another aspect of the embodiments of the present disclosure, an apparatus for acquiring system information is provided, including:

an information sending unit, configured to send a part or all of the system information to a UE through a dedicated signaling.

According to another aspect of the embodiments of the present disclosure, a base station is provided, including the aforementioned apparatus for acquiring system information, or including the aforementioned apparatus for configuring modification period.

According to another aspect of the embodiments of the present disclosure, a UE is provided, including the aforementioned apparatus for acquiring system information, or the aforementioned apparatus for configuring modification period.

According to another aspect of the embodiments of the present disclosure, a communication system is provided, including the aforementioned base station and UE.

According to another aspect of the embodiments of the present disclosure, a computer readable program is provided, wherein when being executed in a base station, the program enables a computer to perform, in the base station, the aforementioned method for acquiring system information, or the aforementioned method for configuring modification period.

According to another aspect of the embodiments of the present disclosure, a storage medium which stores a computer readable program is provided, wherein the computer readable program enables a computer to perform, in a base station, the aforementioned method for acquiring system information, or the aforementioned method for configuring modification period.

According to another aspect of the embodiments of the present disclosure, a computer readable program is provided, wherein when being executed in a UE, the program enables a computer to perform, in the UE, the aforementioned method for acquiring system information, or the aforementioned method for configuring modification period.

According to another aspect of the embodiments of the present disclosure, a storage medium which stores a computer readable program is provided, wherein the computer readable program enables a computer to perform, in a UE, the aforementioned method for acquiring system information, or the aforementioned method for configuring modification period.

The embodiments of the present disclosure have the following beneficial effect: the base station independently sets indicators for system information update for the UEs, respectively, so that for example the MTC UE can acquire the latest system information in time, while ensuring that any extra and unnecessary acquisition of system information is not performed to reduce the power consumption of the MTC UE.

With reference to the following description and drawings, the particular embodiments of the present disclosure are disclosed in detail, and the principles of the present disclosure and the manners of use are indicated. It shall be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It shall be emphasized that the term "comprise/include" used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DESCRIPTION OF THE EMBODIMENTS

The above and other features of the present disclosure will be apparent with reference to the following description and the attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Next, the embodiments of the present disclosure are described by taking the MTC UE as an example. To be noted, the method for acquiring system information and the method for configuring modification period in the embodiments of the present disclosure are not limited to the MTC UE, and any situation where at least two UEs are available is applicable to the embodiments of the present disclosure.

The system information is broadcasted by the base station in a certain cell, so as to control the UE in the idle state or the connected state. As the time changes, the network updates the system information according to the current network state, thus the current LTE system updates the system information using a method of Modification Period (MP).

Figure 1:
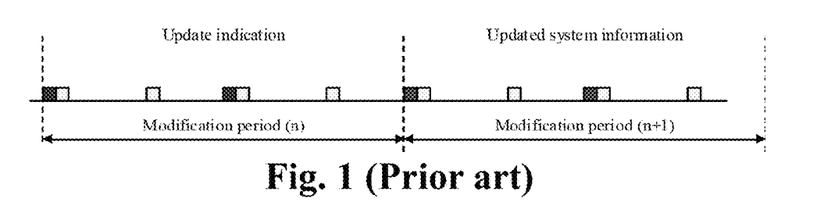
FIG. 1 is a schematic diagram of a system information update in the existed standard.

FIG. 1 is a schematic diagram of a system information update in the existed standard. As can be seen from FIG. 1, when the system information (for example, except the Earthquake and Tsunami Warning System (ETWS), the Commercial Mobile Alert Service (CMAS) and the Extended Access Barring (EAB) parameter) is changed, the network side will send an update indication in a whole modification period n (for example, sending through a paging message), and send updated system information in a modification period n+1.

Once receiving the update indication from the network side, the UE shall acquire new system information at the beginning of a next modification period (e.g., the modification period n+1) following reception of the update indication (e.g., at the modification period n). The modification period $T_{MP}$ is determined by two parameters, i.e., a default paging cycle $T_{paging}$ and a modification period coefficient $MP_{coe}$, which are broadcasted by the base station side.

$$T_{MP}=MP_{coe}*T_{paging} \quad (1)$$

As shown in equation (1), a modification period value can be acquired from a paging cycle value and a modification period coefficient value. In addition, boundary of the modification period is denoted by a System Frame Number (SFN) value meeting certain condition, i.e., SFN mod m=0, m is the number of wireless frames contained in $T_{MP}$.

Embodiment 1

Figure 2:
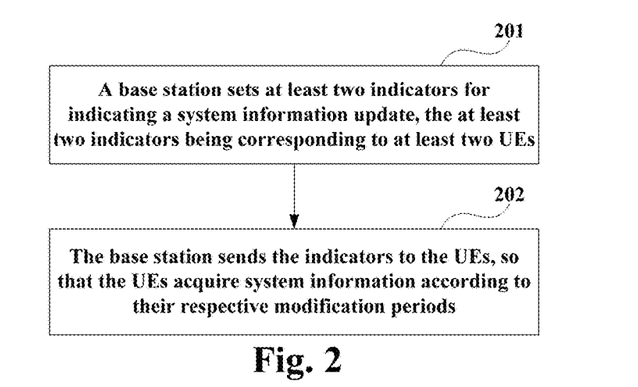
FIG. 2 is a flowchart of a method for acquiring system information according to Embodiment 1 of the present disclosure.

The embodiment of the present disclosure provides a method for acquiring system information, and it is described as follows from the base station side. FIG. 2 is a flowchart of a method for acquiring system information according to the embodiment of the present disclosure. As shown in FIG. 2, the method for acquiring includes:

step 201: a base station sets at least two indicators for indicating a system information update, the at least two indicators being corresponding to at least two UEs; and step 202: the base station sends the indicators to the UEs, so that the UEs acquire system information according to their respective modification periods.

In this embodiment, with respect to at least two UEs in the same cell, the base station side may set an indicator for indicating a system information update, respectively. For the convenience of description, the legacy UE and the MTC UE are taken as examples as follows, but the present disclosure is not limited thereto. For example, other type of UE may also be used. Or there may be three or more types of UEs, and three or more indicators may be used to indicate those UEs. The specific way may be determined based on actual conditions.

In this embodiment, the at least two indicators may be respectively contained in paging messages. The base station may independently set at least two indicators for indicating a system information update, for the purpose of notifying at least two UEs (legacy UE and new MTC UE), respectively. Different modification periods may be configured for the at least two UEs, respectively. For example, different modification periods may be set in advance for the at least two UEs, or the modification periods may be configured by the base station side, but the present disclosure is not limited thereto.

For example, different modification periods may be configured for the legacy UE and the new MTC UE. A modification period PA (for example, it may be referred as a legacy modification period) may be configured for the legacy UE, and a modification period PB (for example, it may be referred as a new modification period) may be configured for the MTC UE, PA may be less than PB.

In this embodiment, after receiving the indicator sent from the base station, the UEs may update the system information respectively according to their respective modification periods.

Figure 3:
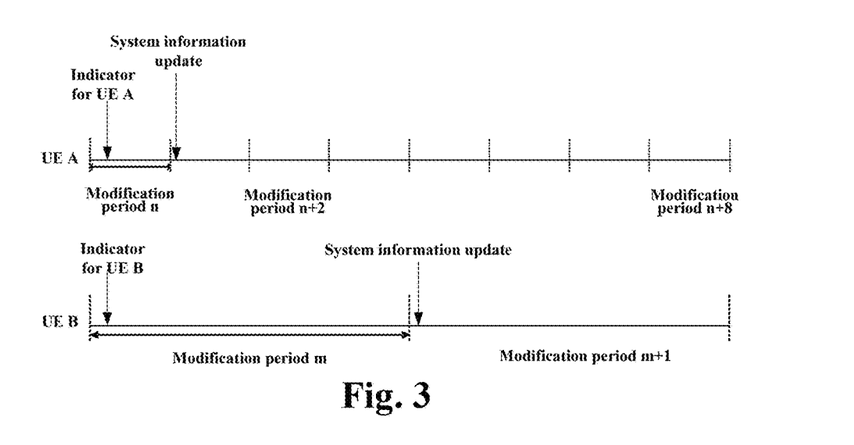
FIG. 3 is a schematic diagram of a method for acquiring system information according to Embodiment 1 of the present disclosure.

FIG. 3 is a schematic diagram of a method for acquiring system information in the embodiment of the present disclosure. As shown in FIG. 3, the modification period of the legacy UE (UE A) is PA, and the modification period of the MTC UE (UE B) is PB. After receiving an indicator in a modification period n, the UE A updates system information in a modification period n+1 when the indicator is sent for the UE A. As shown in FIG. 3, after receiving an indicator in a modification period m, the UE B updates system information in a modification period m+1 when the indicator is sent for the UE B.

As can be seen from the embodiment, the base station independently sets the indicators for indicating a system information update respectively, so that the MTC UEs can acquire the latest system information in time, while ensuring that any extra and unnecessary acquisition of system information is not performed to reduce the power consumption of the MTC UEs.

Figure 4:
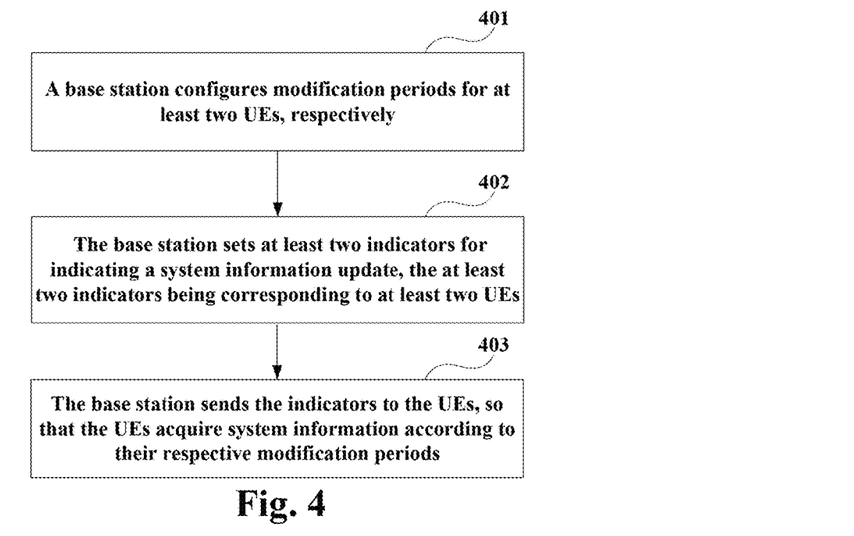
FIG. 4 is another schematic diagram of a method for acquiring system information according to Embodiment 1 of the present disclosure.

FIG. 4 is another schematic diagram of a method for acquiring system information according to the embodiment of the present disclosure. As shown in FIG. 4, the method for acquiring includes:

step 401: a base station configures modification periods for at least two UEs, respectively;

step 402: the base station sets at least two indicators for indicating a system information update, the at least two indicators being corresponding to at least two UEs; and step 403: the base station sends the indicators to the UEs, so that the UEs acquire system information according to their respective modification periods.

In this embodiment, a new modification period value may be determined by the base station, and realized by being broadcasted in a system message or by sending relevant parameter in a dedicated signaling, such as a Radio Resource Control (RRC) signaling or a Medium Access Control (MAC) signaling.

In step 401, the modification period value of the existed standard may be used for one UE (legacy UE), and the following processing may be performed for the other UE (MTC UE): in one way, a modification period value may be sent to the UE. For example, the base station may directly generate a new modification period value, and send it to the UE.

Or, in another way, a paging cycle value may be sent to the UE, so that the UE acquires a modification period value according to the paging cycle value and an existed modification period coefficient. For example, the base station only generates a new default paging cycle $T_{paging}*$ and reuses the existed modification period coefficient, thus corresponding modification period value $T_{MP}*$ may be represented as $T_{MP}*=MP_{coe}*T_{paging}*$.

Or, in another way, a paging cycle value and a modification period coefficient may be sent to the UE, so that the UE acquires a modification period value according to the paging cycle value and the modification period coefficient. For example, the base station generates a new default paging cycle $T_{paging}*$ and a new modification period coefficient $MP_{coe}*$, thus corresponding modification period value $T_{MP}*$ may be represented as $T_{MP}*=MP_{coe}**T_{paging}$.

In addition, the boundary of the new modification period may be determined with the existed method, i.e., SFN mod m*=0, m* is the number of wireless frames contained in the $T_{MP}*$.

After configuring modification periods for at least two UEs respectively in step 401, steps 402 and 403 may be performed to acquire the system information. Please refer to the aforementioned steps 201 and 202 for the details.

In this embodiment, the system information may be updated partially or entirely. Part of the system information may be updated independently or simultaneously for different UEs in the same cell.

In one way, sending the indicators to the UEs in step 403 may further include: sending the indicators to two or more UEs at different timings, so that the two or more UEs simultaneously update a part or all of the system information according to their respective modification periods.

First of all, the system information may be simply classified as follows: for example, system information to be simultaneously updated by the legacy UE and the MTC UE is called as system information of category A, such as a Master Information Block (MIB), a Time Division Duplex (TDD) configuration and a band indicator in a System Information Block 1 (SIB1), and frequency information in a System Information Block 2 (SIB2). Other system information except the system information of category A may be called as system information of category B.

Based on the above content, a new system information update mechanism may be described as follows: defining two system information change indicators: one is used for the legacy UE and the other is used for the new UE. When the system information of category B is changed, the base station may set two indicators for indicating a system information update independently, for the purpose of notifying the legacy UE and the new UE, respectively. When the system information of category A is changed, the base station shall ensure that the legacy UE and the new UE update the system information at the same timing.

Figure 5:
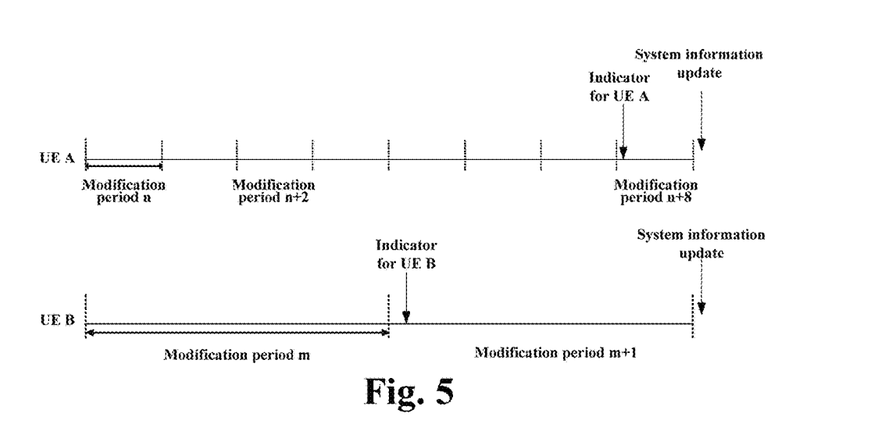
FIG. 5 is still another schematic diagram of a method for acquiring system information according to Embodiment 1 of the present disclosure.

FIG. 5 is still another schematic diagram of a method for acquiring system information in the embodiment of the present disclosure. As shown in FIG. 5, a modification period of the legacy UE (UE A) is PA, and a modification period of the MTC UE (UE B) is PB. In order that the legacy UE and the MTC UE acquire the system information of category A simultaneously, an indicator for UE A may be sent in a modification period n+8, and an indicator for UE B may be sent in a modification period m+1, so that the UE A and the UE B update the system information at the same timing (the beginning of the modification period n+9 and the modification period m+2).

In this embodiment, the method may further include sending a part or all of the system information to the UE through dedicated signaling.

For example, after a new modification period is introduced, if a UE using the new modification period does not acquire the new system information when it wants to initiate an uplink service, the communication of other UE in the current network may be influenced. Therefore, some system information may be sent to the UE through dedicated signaling, such as RRC signaling carried in a Signaling Radio Bearer 1 (SRB1) and an SRB2.

To be noted, the method of sending a part or all of the system information to the UE through dedicated signaling is not limited to a case where at least two indicators are used, or limited to a case where at least two modification periods are used, and it is also applicable in a case where one indicator or one modification period is used.

As can be seen from the embodiment, the base station independently sets the indicators for indicating a system information update respectively, so that for example the MTC UE can acquire the latest system information in time, while ensuring that any extra and unnecessary acquisition of system information is not performed to reduce the power consumption of the MTC UE.

Embodiment 2

Figure 6:
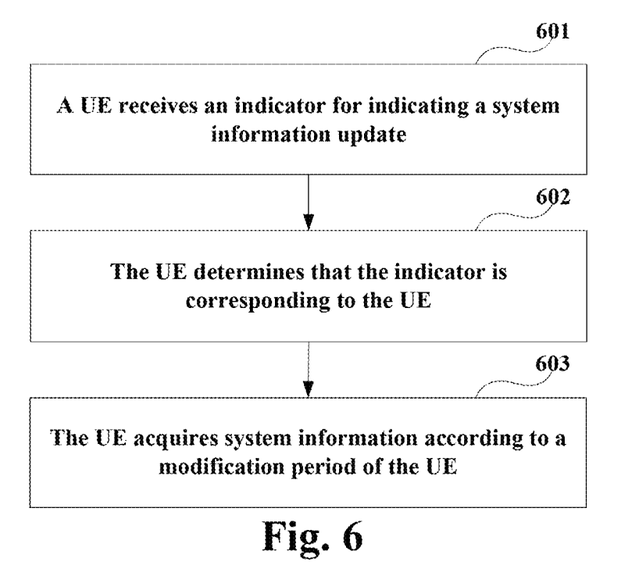
FIG. 6 is a flowchart of a method for acquiring system information according to Embodiment 2 of the present disclosure.

The embodiment of the present disclosure provides a method for acquiring system information, which is described from the UE side, and contents the same as those according to Embodiment 1 are omitted herein. FIG. 6 is a flowchart of a method for acquiring system information in the embodiment of the present disclosure. As shown in FIG. 6, the method for acquiring includes:

step 601: a UE receives an indicator for indicating a system information update;

step 602: the UE determines that the indicator is corresponding to the UE; and step 603: the UE acquires system information according to a modification period of the UE.

In this embodiment, the base station may set indicators for indicating a system information update for at least two UEs, respectively. After one UE (e.g., MTC UE) receives an indicator sent from the base station side, it determines whether the indicator is sent for the UE, i.e., whether the indicator is corresponding to the modification period of the UE for the system information update, and if so, the UE acquires the system information according to its modification period.

Figure 7:
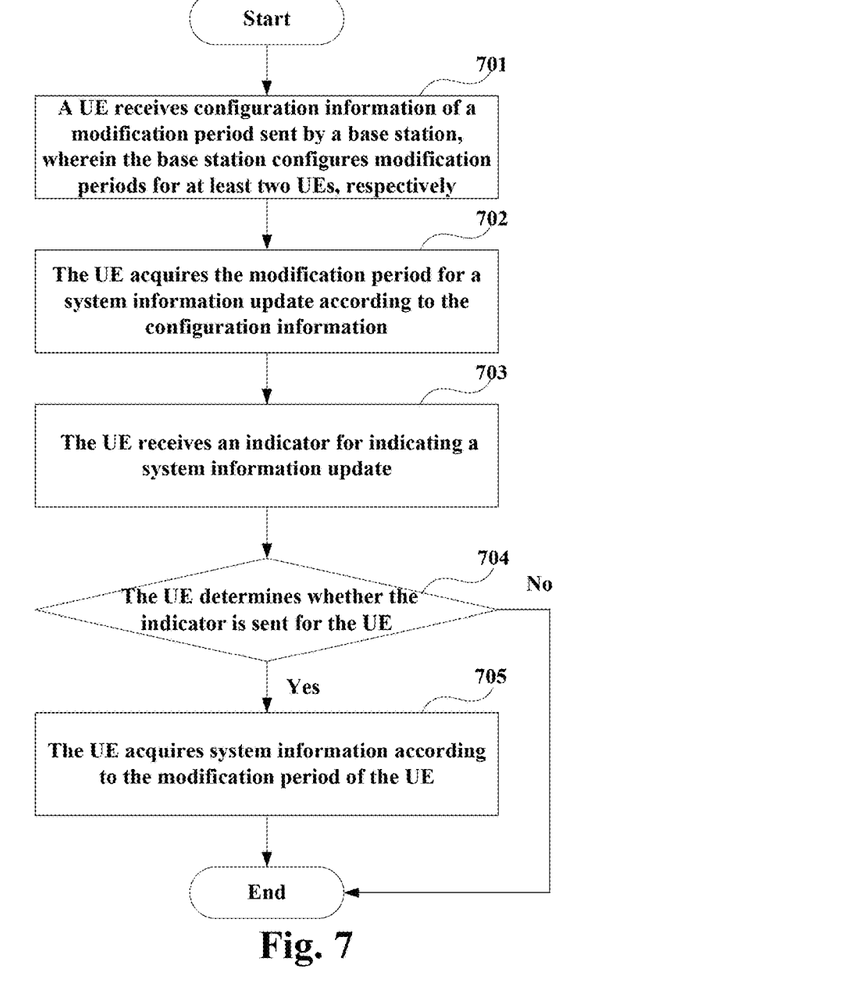
FIG. 7 is another flowchart of a method for acquiring system information according to Embodiment 2 of the present disclosure.

FIG. 7 is another flowchart of a method for acquiring system information according to the embodiment of the present disclosure. As shown in FIG. 7, the method for acquiring includes:

step 701: a UE receives configuration information of a modification period sent by a base station, wherein the base station configures modification periods for at least two UEs, respectively; and step 702: the UE acquires the modification period for a system information update according to the configuration information.

The configuration information of the modification period may include: a modification period value which can be acquired directly by the UE. Alternatively, the configuration information of the modification period may include: a paging cycle value, and the UE may acquire a modification period value according to the paging cycle value and an existed modification period coefficient. Alternatively, the configuration information of the modification period may include: a paging cycle value and a modification period coefficient, according to which the UE may acquire a modification period value.

Step 703: the UE receives an indicator for indicating a system information update;

step 704: the UE determines whether the indicator is sent for the UE, and if so, performs step 705;

step 705: the UE acquires system information according to the modification period of the UE.

As can be seen from the embodiment, the base station independently sets the indicators for indicating a system information update respectively, so that for example the MTC UE can acquire the latest system information in time, while ensuring that any extra and unnecessary acquisition of system information is not performed to reduce the power consumption of the MTC UE.

Embodiment 3

The embodiment of the present disclosure provides a method for configuring modification period, which is described from the base station side and the UE side, respectively, and contents the same as those according to Embodiments 1 and 2 are omitted herein.

Figure 8:
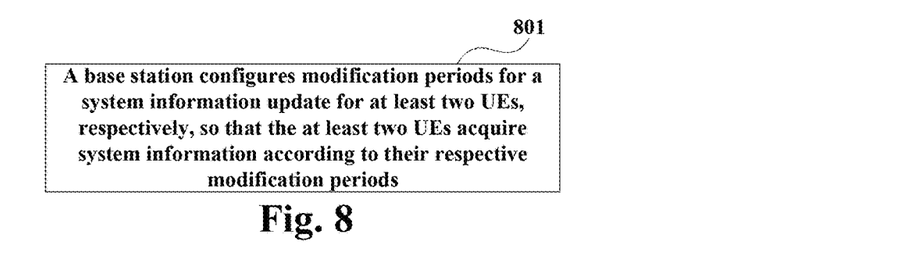
FIG. 8 is a flowchart of a method for configuring modification periods according to Embodiment 3 of the present disclosure.

FIG. 8 is a flowchart of a method for configuring modification period in the embodiment of the present disclosure. As shown in FIG. 8, the method for configuring includes:

step 801: a base station configures modification periods for a system information update for at least two UEs, respectively, so that the at least two UEs acquire system information according to their respective modification periods.

Configuring modification periods for at least two UEs, respectively specifically may include: sending a modification period value to the UE; or sending a paging cycle value to the UE, so that the UE acquires the modification period value according to the paging cycle value and an existing modification period coefficient; or sending the paging cycle value and a modification period coefficient to the UE, so that the UE acquires the modification period value according to the paging cycle value and the modification period coefficient.

Figure 9:
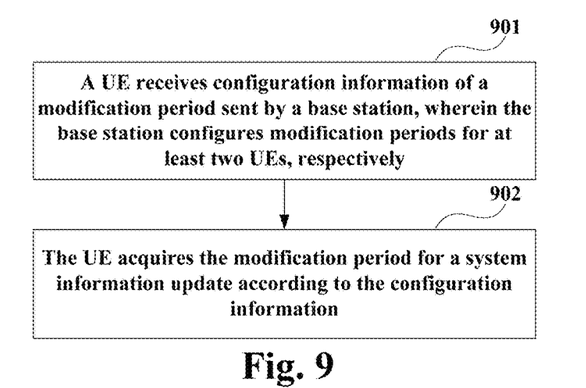
FIG. 9 is another flowchart of a method for configuring modification periods according to Embodiment 3 of the present disclosure.

FIG. 9 is another flowchart of a method for configuring modification periods in the embodiment of the present disclosure. As shown in FIG. 9, the method for configuring includes:

step 901: a UE receives configuration information of a modification period sent by a base station, wherein the base station configures modification periods for at least two UEs, respectively; and step 902: the UE acquires the modification period for a system information update according to the configuration information.

The configuration information of the modification period may include: a modification period value which can be acquired directly by the UE. Alternatively, the configuration information of the modification period may include: a paging cycle value, and the UE may acquire a modification period value according to the paging cycle value and an existed modification period coefficient. Alternatively, the configuration information of the modification period may include: a paging cycle value and a modification period coefficient, according to which the UE may acquire a modification period value.

As can be seen from the embodiment, the base station independently sets the indicators for indicating a system information update respectively, so that for example the MTC UE can acquire the latest system information in time, while ensuring that any extra and unnecessary acquisition of system information is not performed to reduce the power consumption of the MTC UE.

Embodiment 4

The embodiment of the present disclosure provides an apparatus for acquiring system information which is corresponding to the method for acquiring system information in Embodiment 1, and the same contents are omitted herein, the apparatus for acquiring system information may be configured at the base station side.

Figure 10:
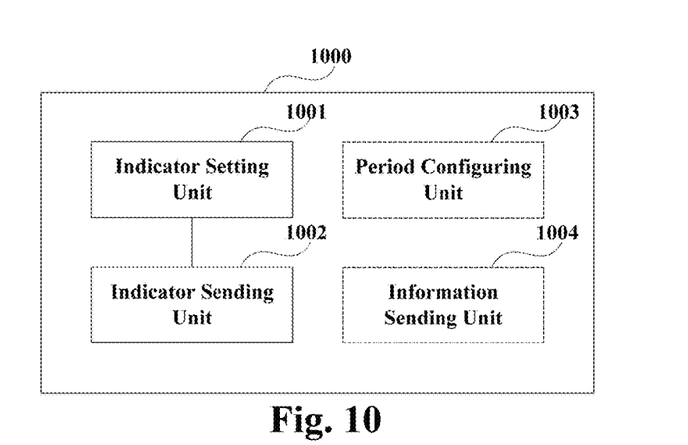
FIG. 10 is a structure diagram of an apparatus for acquiring system information according to Embodiment 4 of the present disclosure.

FIG. 10 is a structure diagram of an apparatus for acquiring system information in the embodiment of the present disclosure. As shown in FIG. 10, the apparatus 1000 for acquiring system information includes an indicator setting unit 1001 and an indicator sending unit 1002;

The indicator setting unit 1001 is configured to set at least two indicators for indicating a system information update, the at least two indicators being corresponding to at least two UEs; and the indicator sending unit is configured to send the indicators to the UEs, so that the UEs acquire system information according to their respective modification periods.

As shown in FIG. 10, the apparatus 1000 for acquiring system information may further include a period configuring unit 1003 configured to configure the modification periods for the at least two UEs, respectively.

As shown in FIG. 10, the apparatus 1000 for acquiring system information may further include an information sending unit 1004 configured to send a part or all of the system information to the UE through a dedicated signaling.

To be noted, the method of send a part or all of the system information to the UE through a dedicated signaling is not limited to a case where at least two indicators are used, or limited to a case where at least two modification periods are used, and it is also applicable in a case where one indicator or one modification period is used.

In one way, when the indicator setting unit 1001, the indicator sending unit 1002 and the period configuring unit 1003 are not included, the apparatus for acquiring system information may further include an information sending unit 1004 configured to send a part or all of the system information to the UE through a dedicated signaling.

Figure 11:
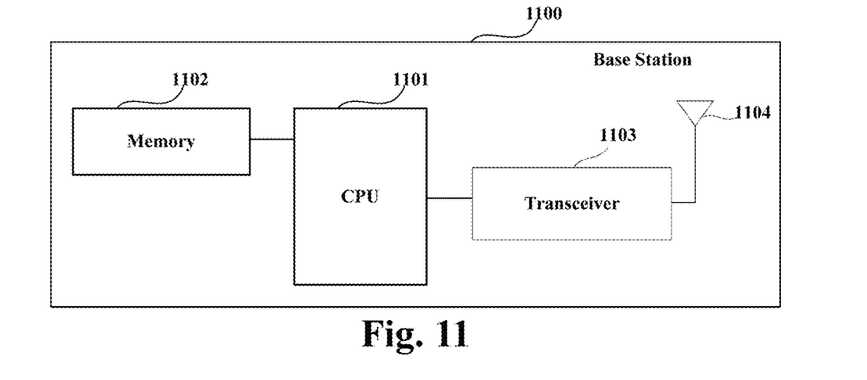
FIG. 11 is a structure diagram of a base station according to Embodiment 4 of the present disclosure.

FIG. 11 is a structure diagram of a base station in the embodiment of the present disclosure. As shown in FIG. 11, a base station 1100 may include a Central Processing Unit (CPU) 1101 and a memory 1102 coupled to the CPU 1101. The memory 1102 may store information related to an acquisition of system information, and an information processing program, execute the program under the control of the CPU 1101 to receive various information sent from the UE, and send request information to the UE.

In one way, the functions of the apparatus 1000 for acquiring system information may be integrated into the CPU 1101, the CPU 1101 may be configured to set at least two indicators for indicating a system information update, the at least two indicators being corresponding to at least two UEs; and send the indicators to the UEs, so that the UEs acquire system information according to their respective modification periods. Alternatively, the CPU 1101 may also be configured to configure modification periods for a system information update for at least two UEs, respectively, so that the at least two UEs acquire system information according to their respective modification periods. Alternatively, the CPU 1101 may also be configured to send a part or all of the system information to UE through a dedicated signaling.

In another way, the apparatus 1000 for acquiring system information may be configured separately from the CPU. For example, the apparatus 1000 for acquiring system information may be configured as a chip connected to the CPU 1101, so as to realize the functions of the apparatus 1000 for acquiring system information under the control of the CPU 1101.

In addition, as shown in FIG. 11, the base station 1100 may further include a transceiver 1103 and an antenna 1104, the functions of the above components are similar to those in the prior art, and herein are omitted.

As can be seen from the embodiment, the base station independently sets the indicators for indicating a system information update respectively, so that for example the MTC UE can acquire the latest system information in time, while ensuring that any extra and unnecessary acquisition of system information is not performed to reduce the power consumption of the MTC UE.

Embodiment 5

The embodiment of the present disclosure provides an apparatus for acquiring system information which is corresponding to the method for acquiring system information according to Embodiment 2, and the same contents are omitted herein, the apparatus for acquiring system information may be configured at the UE side.

Figure 12:
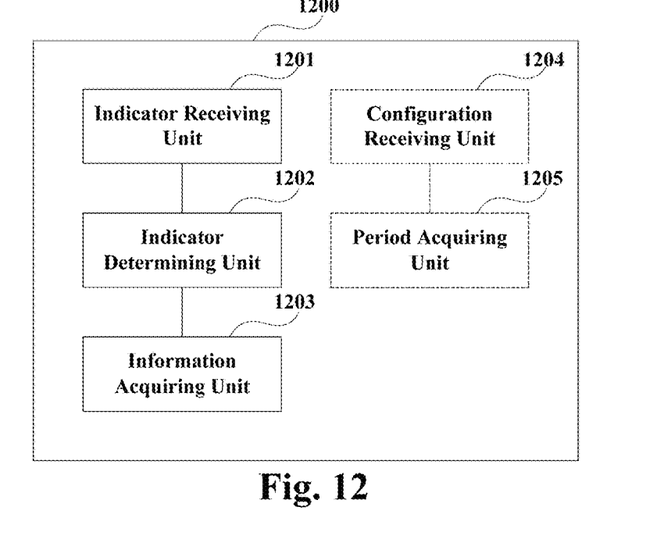
FIG. 12 is a structure diagram of an apparatus for acquiring system information according to Embodiment 5 of the present disclosure.

FIG. 12 is a structure diagram of an apparatus for acquiring system information in the embodiment of the present disclosure. As shown in FIG. 12, the apparatus 1200 for acquiring system information includes an indicator receiving unit 1201, an indicator determining unit 1202 and an information acquiring unit 1203;

The indicator receiving unit 1201 is configured to receive an indicator for indicating a system information update sent by a base station; the indicator determining unit 1202 is configured to determine that the indicator is corresponding to a UE; and the information acquiring unit 1203 is configured to acquire system information according to a modification period of the UE.

As shown in FIG. 12, the apparatus 1200 for acquiring system information may further include a configuration receiving unit 1204 and a period acquiring unit 1205, the configuration receiving unit 1204 is configured to receive configuration information of the modification period sent by a base station, wherein the base station configures modification periods for at least two UEs, respectively; and the period acquiring unit 1205 is configured to acquire the modification period for the system information update according to the configuration information.

Figure 13:
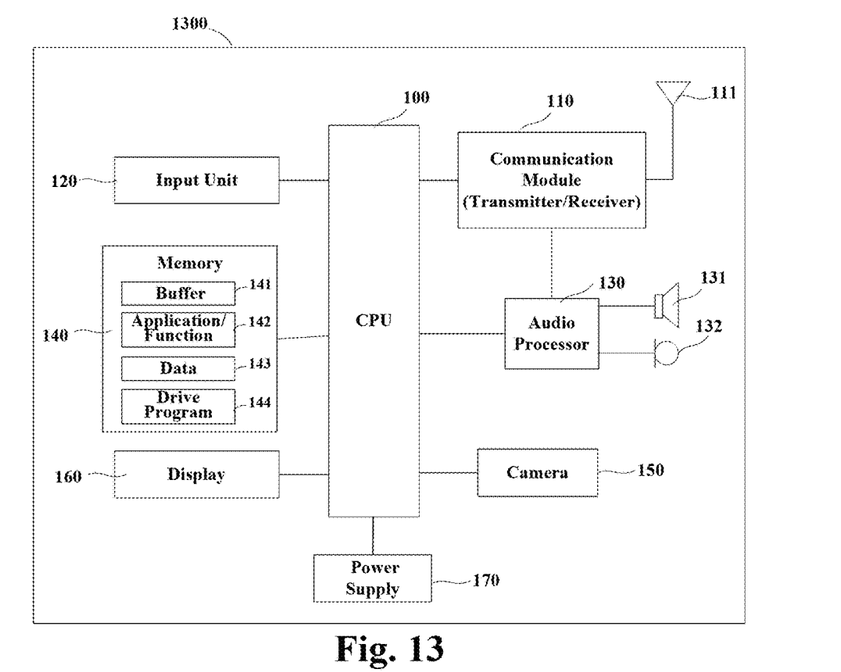
FIG. 13 is a block diagram of a system structure of a UE according to Embodiment 5 of the present disclosure.

FIG. 13 is a block diagram of a system structure of a UE 1300 in the embodiment of the present disclosure. As shown in FIG. 13, the UE 1300 may include a CPU 100 and a memory 140 coupled to the CPU 100. To be noted, the diagram is exemplary, and other type of structure may also be used to supplement or replace the structure, so as to realize the telecom function or other function.

In one way, the functions of the apparatus 1200 for acquiring system information may be integrated into the CPU 100, the CPU 100 may be configured to receive an indicator for indicating a system information update; determine that the indicator is corresponding to the UE; and acquire system information according to a modification period of the UE. Alternatively, the CPU 100 may be configured to receive configuration information of a modification period sent by a base station, wherein the base station configures modification periods for at least two UEs, respectively; and acquire a modification period for the system information update according to the configuration information.

In another way, the apparatus 1200 for acquiring system information may be configured separately from the CPU 100. For example, the apparatus 1200 for acquiring system information may be configured as a chip connected to the CPU 100, so as to realize the functions of the apparatus 1200 for acquiring system information under the control of the CPU 100.

As shown in FIG. 13, the UE 1300 may further include a communication module 110, an input unit 120, an audio processing unit 130, a memory 140, a camera 150, a display 160, and a power supply 170, the functions of the above components are similar to those in the prior art, and herein are omitted.

As can be seen from the embodiment, the base station independently sets the indicators for indicating a system information update respectively, so that for example the MTC UE can acquire the latest system information in time, while ensuring that any extra and unnecessary acquisition of system information is not performed to reduce the power consumption of the MTC UE.

Embodiment 6

The embodiment of the present disclosure provides an apparatus for configuring modification periods which is corresponding to the method for configuring modification period according to Embodiment 3, and the same contents are omitted herein.

Figure 14:
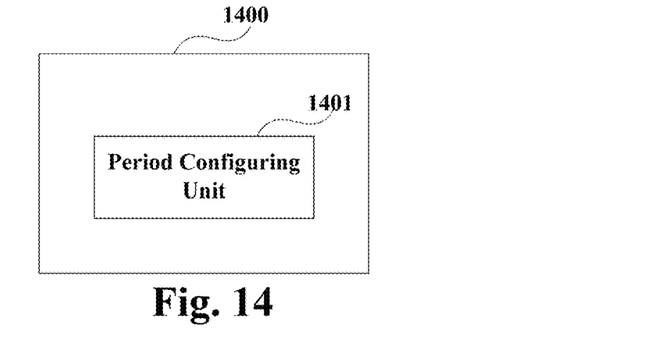
FIG. 14 is a structure diagram of an apparatus for configuring modification periods according to Embodiment 6 of the present disclosure.

FIG. 14 is a structure diagram of an apparatus for configuring modification period in the embodiment of the present disclosure, and the apparatus for configuring modification period may be configured at a base station. As shown in FIG. 14, the apparatus 1400 for configuring modification period includes a period configuring unit 1401 configured to configure modification periods for a system information update for at least two UEs, respectively, so that the at least two UEs acquire system information according to their respective modification periods.

The functions of the apparatus 1400 for configuring modification period may be integrated into a CPU of the base station, or the apparatus 1400 for configuring modification period may be configured separately from the CPU. Please refer to Embodiment 4 for the structure of the base station.

Figure 15:
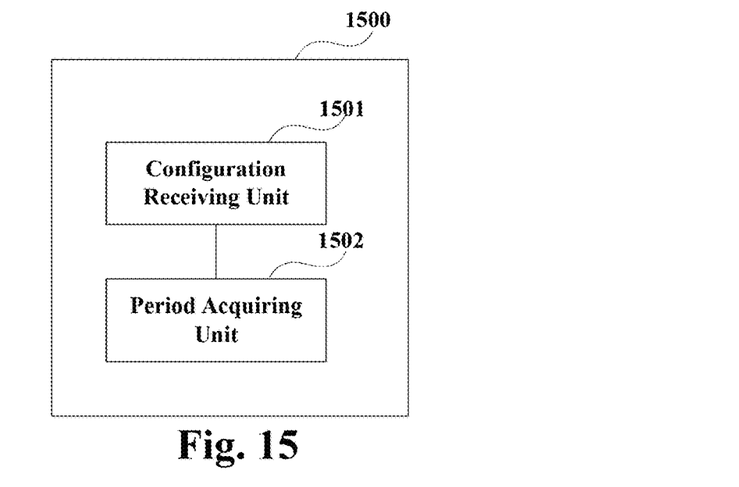
FIG. 15 is another structure diagram of an apparatus for configuring modification periods according to Embodiment 6 of the present disclosure.

FIG. 15 is another structure diagram of an apparatus for configuring modification period in the embodiment of the present disclosure, and the apparatus for configuring modification period may be configured at a UE. As shown in FIG. 15, the apparatus 1500 for configuring modification period includes a configuration receiving unit 1501 and a period acquiring unit 1502;

the configuration receiving unit 1501 is configured to receive configuration information of the modification period sent by a base station, wherein the base station configures modification periods for at least two UEs, respectively; and the period acquiring unit 1502 is configured to acquire the modification period for the system information update according to the configuration information.

The functions of the apparatus 1500 for configuring modification period may be integrated into a CPU of the base station, or the apparatus 1500 for configuring modification period may be configured separately from the CPU. Please refer to the content according to Embodiment 5 for the structure of the UE.

As can be seen from the embodiment, the base station independently sets the indicators for indicating a system information update respectively, so that for example the MTC UE can acquire the latest system information in time, while ensuring that any extra and unnecessary acquisition of system information is not performed to reduce the power consumption of the MTC UE.

Embodiment 7

The embodiment of the present disclosure also provides a communication system including the base station according to Embodiment 4 and the UE according to Embodiment 5, or including the base station or the UE of Embodiment 5.

Figure 16:
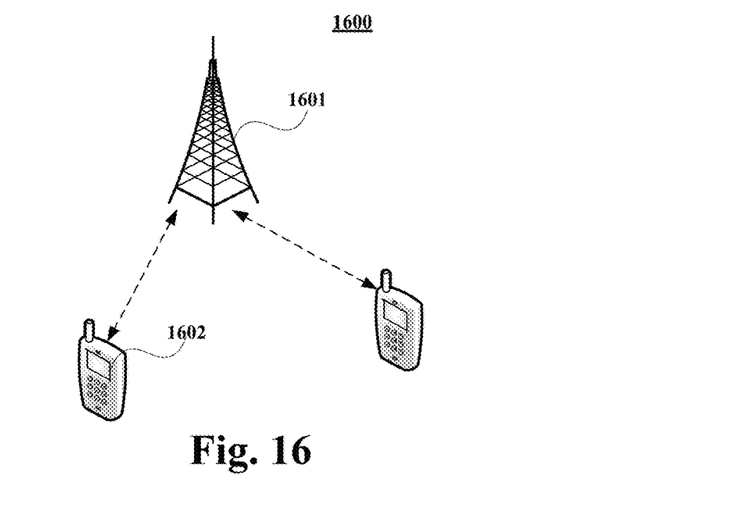
FIG. 16 is a structure diagram of a communication system according to Embodiment 7 of the present disclosure.

FIG. 16 is a structure diagram of a communication system in the embodiment of the present disclosure. As shown in FIG. 16, the communication system 1600 includes a base station 1601 and a UE 1602, the base station 1601 may be the base station 1100 according to Embodiment 4, and the UE 1602 may be the UE 1300 according to Embodiment 5.

The embodiment of the present disclosure also provides a computer readable program, wherein when being executed in a base station, the program enables a computer to perform, in the base station, the method for acquiring system information according to Embodiment 1, or the method for configuring modification period according to Embodiment 3.

The embodiment of the present disclosure also provides a storage medium which stores a computer readable program, wherein the computer readable program enables a computer to perform, in a base station, the method for acquiring system information according to Embodiment 1, or the method for configuring modification period according to Embodiment 3.

The embodiment of the present disclosure also provides a computer readable program, wherein when being executed in a UE, the program enables a computer to perform, in the UE, the method for acquiring system information according to Embodiment 2, or the method for configuring modification period according to Embodiment 3.

The embodiment of the present disclosure also provides a storage medium which stores a computer readable program, wherein the computer readable program enables a computer to perform, in a UE, the method for acquiring system information according to Embodiment 2, or the method for configuring modification period according to Embodiment 3.

The above apparatuses and methods of the present disclosure may be implemented by hardware, or by hardware in combination with software. The present disclosure relates to such a computer readable program that when the program is executed by a logic device, the logic device is enabled to carry out the apparatuses or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations thereof in the Figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combination thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it shall be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. An apparatus for acquiring system information, comprising:
    a memory that stores a plurality of instructions;
    a processor coupled to the memory and configured to cause the apparatus to:
        set at least two indicators for indicating a system information change, the at least two indicators being applied to a first UE not configured with a paging cycle longer than a modification period of the system information and a second UE configured with a paging cycle longer than the modification period of the system information; and
    an indicator transmitter configured to send the indicators to the first UE and/or the second UE, wherein the first UE acquires changed system information according to the modification period and/or the second UE acquires changed system information according to a new modification period.

2. The apparatus for acquiring system information according to claim 1, wherein the processor is further configured to cause the apparatus to configure the modification period for the first UE and the new modification period for the second UE.

3. The apparatus for acquiring system information according to claim 2, wherein when configuring the new modification period for the second UE, the processor further causes the apparatus to:
 send a modification period value to the second UE;
 or send a paging cycle value to the second UE, so that the second UE acquires the modification period value according to the paging cycle value and an existing modification period coefficient;
 or send the paging cycle value and a modification period coefficient to the second UE, so that the second UE acquires the modification period value according to the paging cycle value and the modification period coefficient.

4. The apparatus for acquiring system information according to claim 1, wherein the indicator transmitter is configured to:
 send the indicators to two or more UEs at different timings, so that the two or more UEs simultaneously update a part or all of the system information according to their respective modification periods.

5. The apparatus for acquiring system information according to claim 1, further comprising:
 an information transmitter configured to send a part or all of the system information to the first UE and/or the second UE through a dedicated signaling.

6. The apparatus for acquiring system information according to claim 5, wherein the dedicated signaling comprises a radio resource control signaling.

7. A communication system, comprising:
 a base station comprising an apparatus for acquiring system information according to claim 1; and
 a UE comprising an apparatus for acquiring system information, comprising:
 an indicator receiver configured to receive an indicator for indicating a system information update sent by a base station;
 a memory that stores a plurality of instructions; and
 a processor coupled to the memory and configured to cause the UE to:
 determine that the indicator is corresponding to a UE; and
 acquire system information according to a modification period of the UE.

8. A communication system, comprising:
 a base station comprising an apparatus for acquiring system information according to claim 1; and
 a UE comprising an apparatus for configuring modification period, comprising:
 a configuration receiver configured to receive configuration information of a modification period sent by a base station, wherein the base station configures modification periods for a first UE not configured with a paging cycle longer than a modification period of system information and a second UE configured with a paging cycle longer than the modification period of the system information; and
 a memory that stores a plurality of instructions; and
 a processor coupled to the memory and configured to cause the UE to acquire the modification period for the system information update according to the configuration information.

9. An apparatus for acquiring system information, comprising:
 an indicator receiver configured to receive an indicator for indicating a system information update sent by a base station;
 a memory that stores a plurality of instructions; and
 a processor coupled to the memory and configured to cause the apparatus to:
 determine that the indicator is corresponding to a UE; and
 acquire system information according to a modification period of the UE,
 wherein the base station sets the indicators for a first UE not configured with a paging cycle longer than a modification period of the system information and a second UE configured with a paging cycle longer than the modification period of the system information.

10. The apparatus for acquiring system information according to claim 9, further comprising:
 a configuration receiver configured to receive configuration information of the modification period of the UE sent by a base station, wherein the base station configures modification periods for at least two UEs; and
 the processor further configured to cause the apparatus to acquire the modification period of the UE for the system information update according to the configuration information.

11. The apparatus for acquiring system information according to claim 10, wherein the configuration information of the modification period comprises: a modification period value, or a paging cycle value, or a paging cycle value and a modification period coefficient.

12. An apparatus for configuring modification period, comprising:
 a memory that stores a plurality of instructions; and
 a processor coupled to the memory and configured to cause the apparatus to:
 configure modification periods for a system information update for a first UE not configured with a paging cycle longer than a modification period of the system information and a second UE configured with a paging cycle longer than the modification period of the system information
 so that the first UE acquires changed system information according to the modification period and/or the second UE acquires changed system information according to a new modification period.

13. The apparatus for configuring according to claim 12, wherein when configuring the new modification period for the second UE, the processor further causes the apparatus to:
 send a modification period value to the second UE;
 or send a paging cycle value to the second UE, so that the second UE acquires the modification period value according to the paging cycle value and an existing modification period coefficient;
 or send the paging cycle value and a modification period coefficient to the second UE, so that the second UE acquires the modification period value according to the paging cycle value and the modification period coefficient.

14. A communication system, comprising:
 a base station comprising an apparatus for configuring modification period according to claim 12; and a UE comprising an apparatus for acquiring system information, comprising:
an indicator receiver configured to receive an indicator for indicating a system information update sent by a base station;
a memory that stores a plurality of instructions; and
a processor coupled to the memory and configured to cause the UE to:
determine that the indicator is corresponding to a UE; and
acquire system information according to a modification period of the UE.

15. A communication system, comprising:
a base station comprising an apparatus for configuring modification period according to claim 12; and
a UE comprising an apparatus for configuring modification period, comprising:
a configuration receiver configured to receive configuration information of a modification period sent by a base station, wherein the base station configures modification periods for a first UE not configured with a paging cycle longer than a modification period of system information and a second UE configured with a paging cycle longer than the modification period of the system information; and
a memory that stores a plurality of instructions;
a processor coupled to the memory and configured to cause the UE
a period acquiring unit, configured to acquire the modification period for the system information update according to the configuration information.

16. An apparatus for configuring modification period, comprising:
a configuration receiver configured to receive configuration information of a modification period sent by a base station, wherein the base station configures modification periods for a first UE not configured with a paging cycle longer than a modification period of system information and a second UE configured with a paging cycle longer than the modification period of the system information;
a memory that stores a plurality of instructions; and
a processor coupled to the memory and configured to cause the apparatus to acquire the modification period for the system information update according to the configuration information.

17. The apparatus for configuring modification period according to claim 16, wherein the configuration information of the modification period comprises: a modification period value, or a paging cycle value, or a paging cycle value and a modification period coefficient.

* * * * *